UNITED STATES PATENT OFFICE.

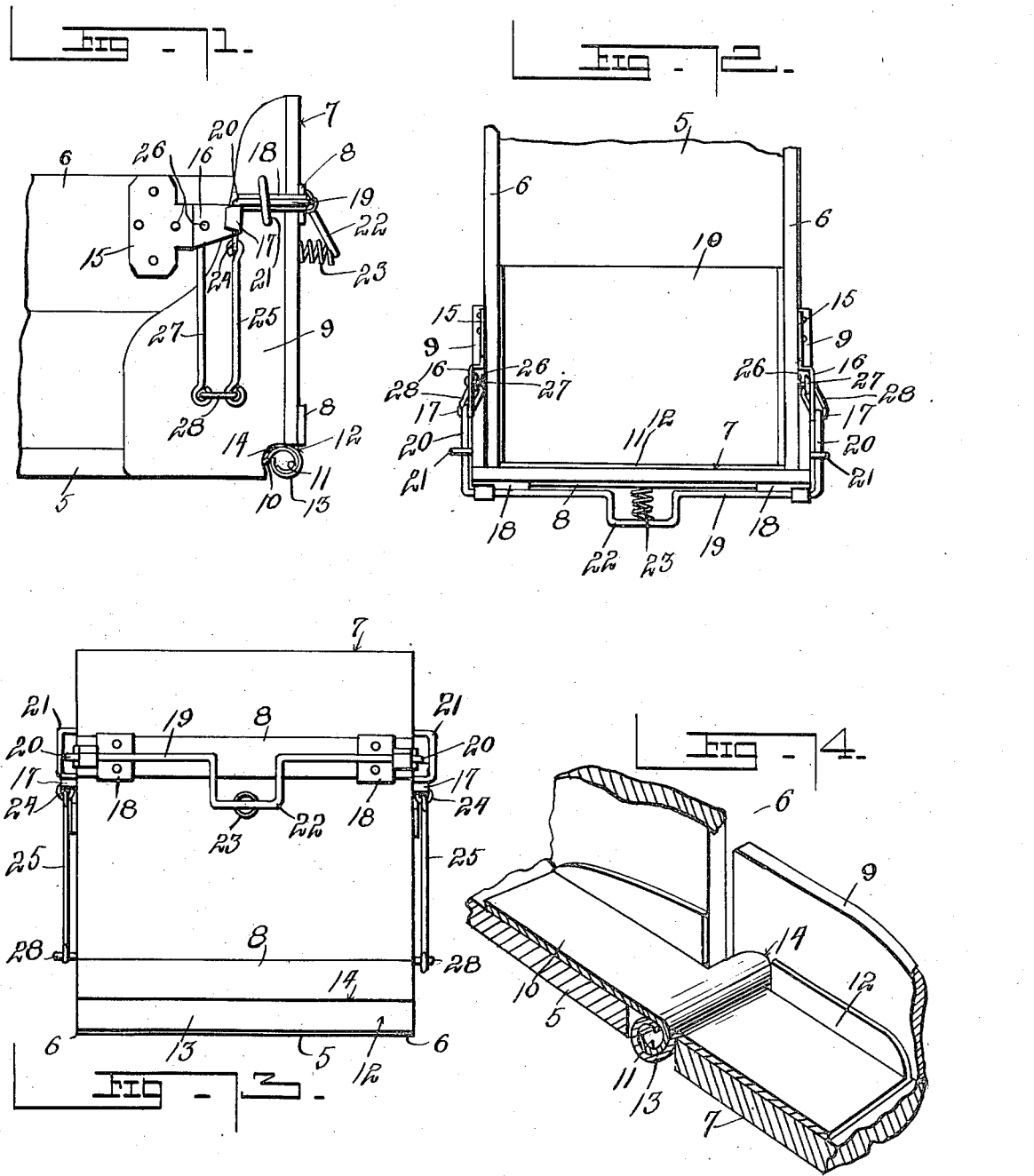

JACOB B. KLINE, OF THURMAN, IOWA, ASSIGNOR OF ONE-HALF TO C. R. PAUL, OF THURMAN, IOWA.

SCOOP END-GATE.

1,194,032.

Specification of Letters Patent.

Patented Aug. 8, 1916.

Application filed July 7, 1913. Serial No. 777,717.

*To all whom it may concern:*

Be it known that I, JACOB B. KLINE, a citizen of the United States, residing at Thurman, in the county of Fremont, State of Iowa, have invented certain new and useful Improvements in Scoop End-Gates; and I do hereby declare the following to be a full, clear, and exact description of the invention, such as will enable others skilled in the art to which it appertains to make and use the same.

This invention relates to new and useful improvements in end gates.

The object of the invention resides in the provision of an end gate adapted to form with the body of the wagon a continual surface with the bottom of the wagon body so that a scoop such as a shovel may be used without engaging against the end of the wagon body, the end of the wagon body being thus at all times protected.

A further object of the invention resides in the provision of an end gate of the class described which may be readily removed from or attached to a wagon body.

The invention further contemplates the provision of means for securing the end gate with relation to the wagon body.

The invention still further contemplates the provision of a structure of the class described which is simple in construction and which possesses full efficiency and ease of operation.

With these and other objects and advantages in view, the invention resides in the novel combination, formation and arrangement of parts to be hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a side elevational view of the rear end of the wagon body with the improved end gate shown associated therewith, Fig. 2 is a top plan view of what is shown in Fig. 1, Fig. 3 is a rear elevational view of the end gate and Fig. 4 is a perspective view showing the hinged plates and the manner of attaching the same to the wagon body and end gate.

Referring now more particularly to the drawings, wherein is shown the preferred form of the invention, 5 designates the bottom and 6 the side of a conventional form of wagon body and the end gate therefor is shown as comprising a body portion 7 reinforced by the strips 8 on the outer face thereof and provided with inwardly extending flanges 9 embracing the sides of the wagon body.

The means for hingedly and removably connecting the end gate to the wagon body and at the same time protecting the end of the bottom 5 of the wagon body comprises a plate 10 secured on the end portion of the bottom 5 and having a portion of each side bent upwardly and secured to the adjacent side 6 of the wagon. The plate is extended outwardly of the bottom 5 and downwardly and inwardly bent to provide an open sleeve 11, the ends of which extend past the side of the body. A second plate 12 is secured on the inner face of the end gate and has a portion of each side bent to engage the adjacent flange 9, the plate being extended past the body portion of the end gate and bent to provide a second open sleeve 13 the ends of which are positioned in cutaway portions 14 of the flanges 9. In securing the end gate to the wagon body, the free edge of each sleeve is inserted in the open portion of the other sleeve by sliding the sleeve 11 in the sleeve 13 and thus securing a pivotal connection.

Means are provided for locking the end gate in closing position. To accomplish this, the upper end portion of each side 6 is provided with a plate 15 having at one end an outwardly offset extension 16 terminating in a hook 17. Secured on each end of the upper strip 8 is a plate 18 having portions of its side bent upwardly and inwardly to provide a bearing for a shaft 19. The end portions of the shaft are directed inwardly and terminate in lateral extensions 20 for engagement with the hooks 17. A U-shaped guide 21 is provided for limiting the movement of the end of the shaft and the outer ends of the plates 18 are directed inwardly over the flanges 9 to form a bearing for the inwardly directed portions of the shaft. In order to hold the extensions 20 of the shaft resiliently in engagement with the hooks 17, the central portion of the shaft is offset as at 22 and an expansible spring 23 is disposed between the offset portion and body of the end gate. The offset portion also serves as a handle for releasing the extensions 20. When it is desired to unload the wagon, means are provided for holding the end gate in a horizontal plane.

The free extremity of the extension 20 is provided with an eye portion 24 and a link 25 is pivotally secured thereto. A bolt 26 is passed through the offset extension 16 of the plate 15 and through the side of the wagon and a second link 27 has hooked engagement therewith and is connected to the link 25 by a short link 28. From the foregoing it is observed that when the end gate is in closing position the links fold and offer no inconvenience and when the gate is opened the links hold the same in a horizontal plane.

It is observed that when the end gate is opened, it forms with the bottom of the wagon a practically continuous surface which facilitates the use of a scoop and which protects the end of the wagon body.

What is claimed is:

The combination with a wagon body and an end gate, of a plate disposed on the upper face of the body bottom and having one side extended therepast and bent downwardly and inwardly to form a continuous tubular longitudinally extending open sleeve, said plate having flanges at its sides resting against the sides of the body, and a plate on the inner face of the end gate having one side extending therepast and downwardly and upwardly bent to provide a longitudinally extending tubular open sleeve, the last-mentioned plate being provided with side flanges terminating short of the front of the plate and lying in the planes of the first flanges, said end gate sleeve being engaged with the body bottom sleeve and forming a hinge, the bodies of the plates lying in the same plane when the gate is dropped.

In testimony whereof, I affix my signature, in the presence of two witnesses.

JACOB B. KLINE.

Witnesses:
 J. C. PAUL,
 C. H. PAUL.